C. GREEN & W. WILSON, Jr.
Metallic Can.

No. 8,126. Reissued March 19, 1878.

Attests
W. C. Hawtridge,
Owen Darcy

Inventor
Charles Green
William Wilson Jr.
By their Attorney
J. Bonsall Taylor.

UNITED STATES PATENT OFFICE.

CHARLES GREEN AND WILLIAM WILSON, JR., OF WILMINGTON, DEL.

IMPROVEMENT IN METALLIC CANS.

Specification forming part of Letters Patent No. 183,760, dated October 31, 1876; Reissue No. 8,126, dated March 19, 1878; application filed November 1, 1877.

*To all whom it may concern:*

Be it known that we, CHARLES GREEN and WILLIAM WILSON, Jr., both of Wilmington, in the county of New Castle and State of Delaware, have invented a new and useful Improvement in Metallic Cans, of which we hereby declare the following specification to be a full, clear, and precise description, and sufficient to enable those skilled in the art to which our invention appertains to comprehend and employ it, reference being had to the accompanying drawings, which form part of this specification.

Our invention relates to the class of hermetically-sealed cans for paints, preserves, powder, and the like in which the parts which are to be separated to open the can are joined by means of solder, and which have a wire inclosed in such relation to said parts and the solder joining them that when traction is exerted upon the wire it is caused to bear against and break the solder; our improvement having for its object such construction of a can of the above character as will render the sealed and filled can easily packed for transportation, and will also provide a smooth edge for the brush (when paints are inclosed) after the can has been opened.

Our invention consists, substantially, in providing the chine of a can-body with a circumferential corrugation, bulging into the interior of the can and opening outward, when in combination with a wire laid in said corrugation, and a cover having a straight or slightly-curved rim of depth sufficient to overlap said corrugation and be secured below the same by solder to the can-body.

Figure 1:
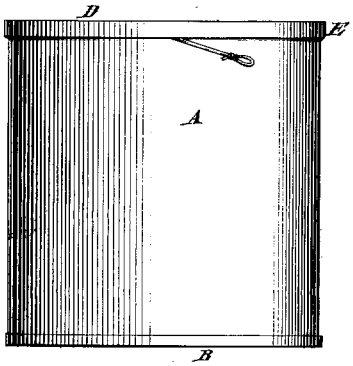
Figure 2:
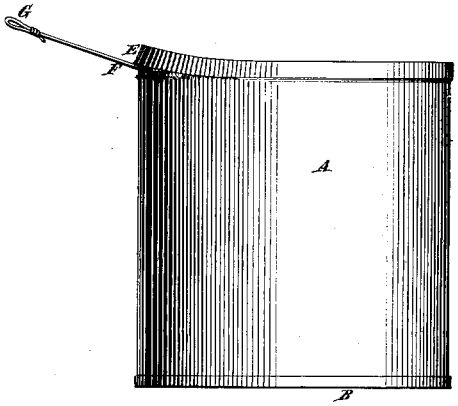
Figure 3:
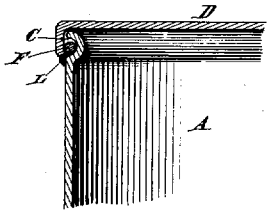
Figure 4:
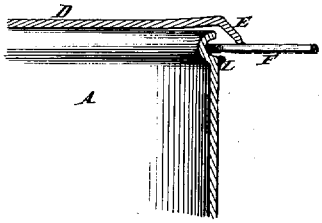

In the accompanying drawings, Figure 1 is a side elevation of our finished can sealed up; Fig. 2, a similar view of the same under process of opening; Fig. 3, a magnified central sectional detail of a portion of the cover and body sealed up; and Fig. 4, a similar view of the same parts under process of opening.

Like letters of reference denote like parts wherever used.

With reference to the drawings, the following is an explanation of one form of construction of a can embodying our invention.

A is the body of the can, made in any convenient manner, of any fit material. B is the bottom, secured as desired to the body. The upper chine is corrugated inward, so as to form a circumferential groove, C, opening outward, the corrugation being effected by rollers or other means. D is the cover, provided with a rim, E, to fit over the body so as to overlap and inclose the corrugation; L, the solder used to secure the cover to the body. F is a wire or piece of metal, alloy, or other suitable material, of size sufficient to lie within the groove C and to surround the can, one end being secured conveniently within the groove to the body, and the other being formed into an eye, knob, bend, hook, or other conformation, G, for facility in grasping.

When the can so constructed is filled, the wire laid in the groove, and one end of it secured, as described, the cover is then put on, (leaving the eye G projecting outside beneath the rim, a notch being cut for it in the rim, if desired,) and soldered at L, on the line of contact of rim and body, immediately below the wire in the groove.

The corrugation in which the wire lies, bulging, as will be readily understood, into the interior of the can, permits a cover with a straight (Fig. 1) or only slightly-curved rim (Fig. 3) to be employed, and thereby enables the production of a can which, when filled and sealed up, is as readily packed for transportation as any ordinary form of can, in which no wire ripping device is used.

To open, the eye of the wire is grasped by hand, hook, pinchers, or other means, force exerted out and down upon it, drawing the wire out, and thereby breaking the line of solder only, without section or damage to the can other than the bending of the metal of the cover.

The convex surface of the groove forms a smooth edge for the brush, when paints are inclosed, which is not injured or touched in either sealing or opening.

Both ends of the can may be secured in the manner described.

Having thus described our invention, we claim and desire to secure by Letters Patent of the United States:

1. In a can the parts of which to be separated to open the can are joined by solder, and which is provided with a ripping-wire inclosed in such relation to said parts and the solder joining them that when traction is exerted upon the wire it is caused to bear against and break the solder, a circumferential groove or corrugation, C, in the chine or portion of the top body of the can which is covered by the rim of the cover, bulging into the interior of the can and opening outward, adapted to receive and hold the said ripping-wire, substantially as shown and described, and for the purpose specified.

2. In combination, a can-body, A, provided with a corrugation, C, a cover, D, provided with a rim, E, and secured to the body by solder L, and a free wire, F, laid in the corrugation C, so as to be between the can-body and the rim of the cover, fastened to the can-body at one end and terminating in an eye, G, at the other, the eye projecting from beneath the rim, the whole arranged so that the wire, when seized by its eye and forcibly drawn, will sever the solder.

In testimony whereof we have hereunto signed our names.

CHARLES GREEN.
WM. WILSON, JR.

In presence of—
JOSEPH DE GODT,
W. GREEN.